United States Patent Office 3,548,661
Patented Dec. 22, 1970

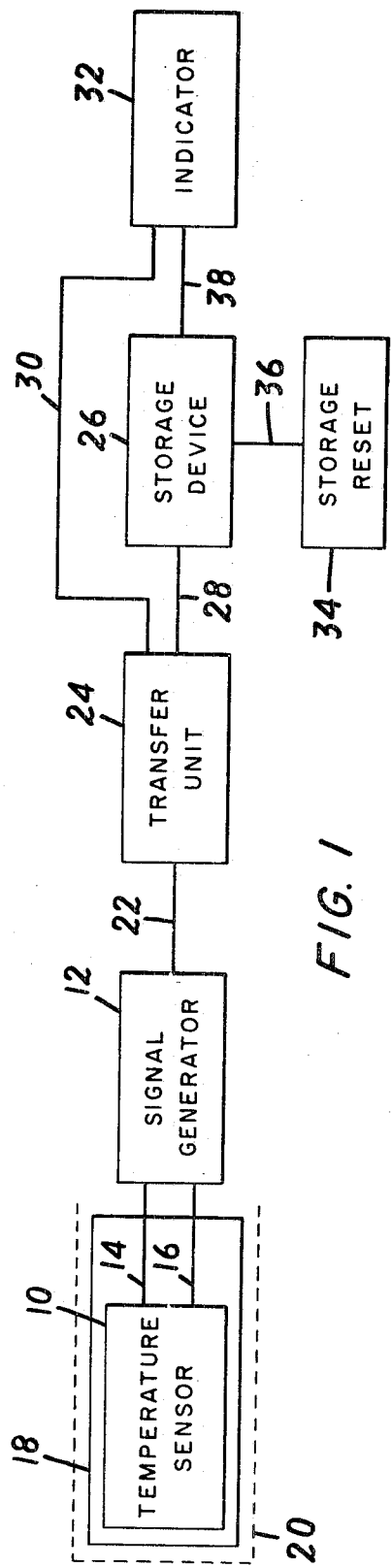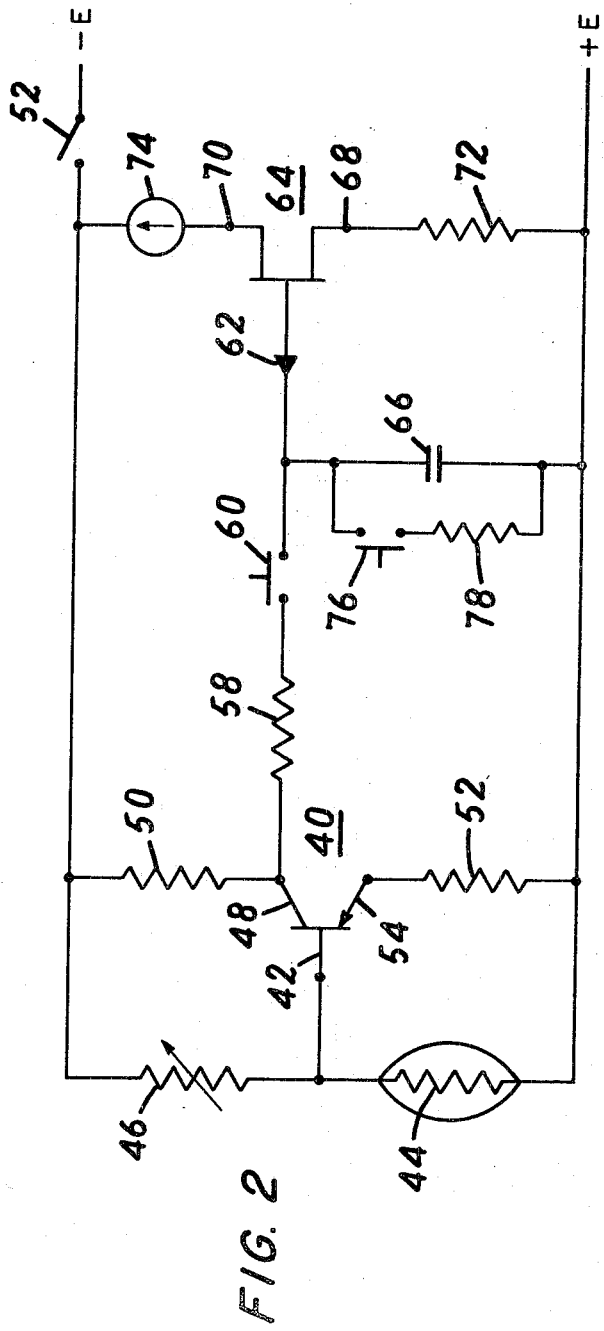

3,548,661
ELECTRICAL THERMOMETER
Arnys Clifton Lilly, Jr., and Elwood Maurice Gentry, Richmond, Va., assignors to Philip Morris Incorporated, New York, N.Y., a corporation of Virginia
Filed Mar. 11, 1969, Ser. No. 806,219
Int. Cl. G01k 1/02, 7/24
U.S. Cl. 73—362
5 Claims

ABSTRACT OF THE DISCLOSURE

An electrical thermometer for periodic temperature measurement and long-term display thereof. The thermometer embodies an electrical circuit including continuously-operating temperature detection means, a particular output signal of which is coupled through a momentarily-conductive transfer unit to a storage device and an indicator. Operation of the transfer unit provides information concerning temperature existing at a particular point in time and display thereof is continuously provided by interconnection of the storage device and indicator. A reset facility is provided whereby the contents of the storage device may be cleared and temperature information may be updated.

BACKGROUND OF THE INVENTION

This invention relates to clinical temperature measurement and more particularly to an electrical thermometer for sensing, storing and displaying temperature information.

DESCRIPTION OF THE PRIOR ART

Clinical temperature measuring devices are presently of two general types, the conventional mercury thermometer and the more recent electrical thermometers. The latter have several distinct advantages over the former in providing faster temperature readings, increased accuracy in measurement and readily observable displays. Further, the normal requirement for sterilization of the thermometer may be dispensed with in the use of the electrical thermometer where disposable temperature collecting means are employed.

Temperature collecting means for clinical electrical thermometers generally comprise a detector probe insertable into the body cavity, the probe including a thermistor or other temperature-sensing element, such as a transistor whose characteristics are variable with temperature. The probe conducts heat directly to the temperature-sensitive element contained therewithin, and conductors disposed in the probe interconnect the element and an associated measuring circuit. The probe may be contained within an encircling outer sheath which is disposable.

Known mercury circuits for electrical thermometers include, in addition to the temperature-sensing element carried in the probe, signal generator means providing output signals indicative of sensed temperature and means for displaying the output signals. Such circuits do not include any separation between the functions of temperature information collection and display thereby and particularly not a separator having the capacity to store collected temperature information for long-term display thereof. Thus, the temperature indication provided by these circuits is continuously related to collected temperature information and the devices do not lend themselves to applications wherein it is desired to maintain the temperature probe in its operative position, i.e. in the temperature zone under study, and yet to display information other than continuous temperature changes. Otherwise stated present devices do not include the capacity for deriving periodically spaced temperature information from continuously operative temperature collection means and for storing same. Thus, long-term display of previously sensed temperature data and convenient updating thereof is not provided in present devices.

SUMMARY OF THE INVENTION

A primary object of the present invention is to provide an improved circuit for detecting and processing temperature information.

It is a further object of the invention to provide an electrical thermometer in which the functions of temperature collection and display of collected information are independent of one another and where long-term display may be obtained at any particular time for temperature information then detected.

It is an additional object of the invention to provide an electrical thermometer having the capacity for storing collected temperature information and periodically updating same.

These and other objects of the present invention are achieved by an electrical circuit having means for continuously detecting temperature data, operator-controlled means for transferring and storing said data at a particular time and indicating means responsive to said operator-controlled means for continuously displaying temperature data detected at said time. For this purpose the circuit comprises a temperature-detecting portion comprised of a temperature-sensitive element and associated signal generator means providing signals indicative of variations in the characteristics of said temperature-sensitive element, a transfer and storage portion manually operable to receive and store the electrical signal corresponding to the temperature existing at the time of operation thereof, and a third portion directly connected to said transfer and storage portion and comprised of a circuit adapted to display said received and stored electrical signal.

The circuit is employable with either the disposable or non-disposable type of temperature probe and includes further an updating facility wherein currently displayed temperature information may be readily cleared from the transfer and storage portion to accommodate display and subsequent temperature information.

The objectives and features of the invention will be further evident from the following detailed description of a preferred embodiment and from the drawings.

BRIEF DESCRIPTION OF THE DRAWINGS

FIG. 1 is a block diagram of the electrical thermometer of the invention.

FIG. 2 is a schematic diagram of a preferred circuit for the thermometer of FIG. 1.

DESCRIPTION OF A PREFERRED EMBODIMENT

Referring to FIG. 1, the temperature detection portion of the thermometer of the invention may be seen to include a temperature-sensitive element 10 and a signal generator 12 connected thereto. Element 10 is preferably a thermistor or transistor having a temperature-dependent characteristic, such as electrical resistance. Element 10 is interconnected by conductors 14 and 16 to signal generator 12 whereby signals having amplitudes proportional to instantaneous values of the temperature-dependent characteristic are provided. A probe, indicated at 18 may be employed for seating element 10 in the temperature zone under study, e.g. a body cavity, and for maintaining the element in heat-conductive relation with the temperature zone. In this arrangement conductors 14 and 16 extend from the forward section of the probe where element 10 is seated throughout the probe to the signal generator. A heat-conductive sheath is shown generally at 20 and normally encircles the probe, interchange of the sheath permitting reuse of the probe without sterilization thereof.

The output of signal generator 12 is conducted over line 22 to the second functional portion of the subject thermometer which comprises a transfer unit 24 and a storage device 26 interconnected by line 28. Transfer unit 24 in its simplest form may be a momentarily-conductive device such as push-button switch which is operated manually or automatically to apply detected temperature information from signal generator 12 over line 28 to the storage device and over line 30 to indicator 32, the third functional portion of the thermometer. Indicator unit 32 may comprise any suitable meter or like display device responsive to the signals applied thereto to indicate signal amplitude. It will be apparent that temperature information is applied to indicator 32 directly from transfer element 24 during the moment of operation thereof over line 30 and thereafter from storage device 26 over conductor 38. A reset element 34 is connected by line 36 to storage device 26. Reset 34 is operated manually or by an automatic controller to remove stored signals from the storage device.

In operation of the thermometer, probe 18 is inserted into the temperature zone under study and power is applied to signal generator 12 and to indicator 32, and to the transfer unit and storage device if active (power consuming) elements are employed therein. The value of the temperature-sensitive characteristic of element 10 is modified in accordance with the temperature existing in the temperature zone, said modifications resulting in proportional variations in the magnitude of the signal provided on conductor 22 by signal generator 12. The generator may include amplifying circuits such that the signals appearing on conductor 22 are of suitable amplitude for use in the remaining circuits of the thermometer. This temperature detection portion of the thermometer is thus operative to provide signals which are continuously "tracking" or indicative of the instantaneous value of the temperature-dependent characteristic of element 10 and thus of the temperature in the temperature zone, as long as probe 18 remains therein.

Transfer unit 24 is normally non-conductive and in such state separates temperature detection and temperature indication. It is operated to accommodate measurement of instantaneous temperature in the temperature zone. To this effect, unit 24 conducts through to its output terminals the signal appearing at conductor 22 at the time of its operation. Upon completion of this period of conductivity or signal gating, transfer unit 24 is deactivated and the functional separation of the temperature detection and the temperature indication portions of the thermometer is renewed. Thus, temperature variations thereafter sensed by element 10 are ineffective to modify the state of circuitry to the right of the transfer element in FIG. 1.

At the instant of signal gating, the output of transfer unit 24 is both stored by storage device 26 and displayed by indicator 32. Immediately following the tenure of operation of transfer unit 24, the signal on conductor 30 is no longer indicative of the sensed temperature. At this point, however, the stored signal indicative of temperature is available from storage device 26 on line 38 to provide proper information to the display device, and the sensed temperature is continuously indicated.

Operation of the thermometer in this manner provides a constant readout of a temperature prior in time to that which detector 10 is currently sensing. In order to update the thermometer, reset 34 is operated and the storage device 26 is thereby cleared of its contents. The indicator thereupon returns to a no-display condition. Upon reactivating transfer unit 24, signals indicative of the then-existing temperature information are conducted through to the storage and display circuits.

Referring to FIG. 2, a simplified version of preferred circuitry employable in the thermometer of the invention is illustrated. The circuit employs a first transistor 40 which is arranged in a common-emitter configuration, the base 42 thereof being connected to a thermistor 44 and a variable resistor 46 which are further connected to power supplies +E and —E. The transistor collector 48 is coupled through resistor 50 to power supply —E through an on-off switch 52. The transistor emitter 54 is connected through resistor 52 to supply +E. Collector 48 is further connected through a resistor 58 and push-button switch 60 to the gate 62 of a second transistor 64, this gate being connected to a capacitor 66. Transistor 64 is a field-effect transistor, and includes a source terminal 68 and a drain terminal 70. The source terminal is connected through a resistor 72 to the supply +E and the drain terminal 70 is connected through a microammeter 74 and switch 52 to the supply —E. A push-button switch 76 and a resistor 78 are connected across capacitor 66.

The temperature detecting portion of the circuitry of FIG. 2 includes all of the circuitry to the left of resistor 58 and more particularly includes thermistor 44 as its temperature-dependent element and the single stage employing transistor 40 as its signal generator. In the operation of this portion of the circuitry, a temperature-induced change in the resistance of thermistor 44 results in a proportional change in the D.C. level existing at base 42. This D.C. variation is amplified by transistor 40 and appears as a relatively large scale proportional change in the D.C. voltage at collector 48.

While the thermometer is intended primarily for clinical temperature studies, e.g. 95–110° F., variable resistor 46 is adjustable to permit operation of the thermometer in other temperature regions. Furthermore, thermistor 44 may be selected with particular characteristics for a given temperature study.

The direct current voltage at collector 48 is constantly applied to the momentarily-conductive transfer unit of FIG. 2 which comprises a push-button switch 60. Operation of the switch at a particular point in time at which a temperature measurement is desired is effective to conduct through to the remaining circuitry of FIG. 2 the D.C. voltage then present at collector 48. The voltage is applied to the storage device of FIG. 2 which comprises a capacitor 66, and is further coupled to the third portion of the circuit which is adapted to display the magnitude of sensed temperature. This circuit portion includes the display element, a temperature-graduated microammeter 74, and the single stage employed for controlling current flow therethrough. While a field-effect transistor 64 is employed in the circuitry of FIG. 2, the indicating unit is not restricted to such a device.

The D.C. voltage is conducted through push-button switch 60 until accumulated by capacitor 66, the charging time constant being defined by resistor 58 and the capacitor. Thereupon, transistor 64 is brought to a conductive state wherein the magnitude of current flowing from source 68 to drain 70 and then through meter 74 is proportional to the magnitude of the voltage across capacitor 66. It will be evident that this current flow will be constant for a prolonged period of time, i.e. as long as capacitor 66 retains its charge.

By reason of the use of a simple capacitor as the storage element in the thermometer, the indicating circuitry performs with a slight delay attributable to the RC time constant defined by resistor 58 and capacitor 66. In particular since the voltage across the capacitor cannot change instantaneously, the signal controlling the indicating circuitry does not reach its maximum level at the gate 62 of transistor 64 until after the capacitor charges through resistor 58 to the applied voltage level. Thus, the signal gated through the transfer unit is applied directly to the indicating circuitry and stored simultaneously by the circuit of FIG. 2. It will be evident that faster-operating transistor units and storage devices may be employed in a more expensive thermometer.

In order to reset the circuit of FIG. 2 for purposes of updating temperature indication, switch 76 is operated. This results in a clearing of the storage element since capacitor 66 is thereby provided with a discharge path through resistor 78.

Thereafter, switch 60 may again be operated to transfer more current temperature information therethrough to storage element 66 and indicator 74. The thermometer may be repeatedly cycled in this manner to provide periodic temperature data.

In summary it will be evident that the circuitry of FIG. 2 is set in response to operation of push-button switch 60 to display desired temperature and provides constant indication of such temperature until the circuit is reset by operation of push-button switch 76.

Numerous variations may be employed without departing from the spirit of the present invention. For example, where temperature measurements are to be effected in accordance with a predetermined periodicity, transfer unit 60 may comprise an electronic switch operated by an associated timing device. In such case this timing device may also operate the system reset device which may also take the form of an electronic switch device. Further, it will be evident to those skilled in the art to which the invention relates that various storage devices may be employed in place of the capacitor employed in the preferred circuit. In view of these and other alternatives employable in practicing the invention it is intended that the description set forth above be interpreted in a descriptive and not in a limiting sense.

What is claimed is:

1. An electrical circuit for measuring and indicating temperature comprising, in combination, a circuit element having a temperature-dependent electrical characteristic, signal generator means connected to said element for producing direct current voltages having magnitudes proportional to the instantaneous value of said electrical characteristic, an indicator unit, and operator-controlled momentarily-conductive switch having one contact connected to said signal generator and a second contact connected to said indicator unit, and a capacitor connected to said second contact for storing the direct current voltage conducted from said first contact to said second contact by operation of said switch, said indicator unit including a field-effect transistor responsive to said stored voltage for indicating its magnitude.

2. An electrical thermometer comprising in combination the electrical circuit of claim 1 and a probe adapted for insertion into a temperature zone under study, said probe containing said temperature-dependent circuit element of said circuit and maintaining same in heat-conductive relation to said zone.

3. The thermometer claimed in claim 2 including further a disposable heat-conductive sheath encircling said probe.

4. The electrical circuit claimed in claim 1 further including another operator-controlled switch connected across said capacitor for removing stored direct current voltages therefrom.

5. The electrical circuit claimed in claim 4 wherein said indicator unit comprises a single stage circuit including said field-effect transistor and having a temperature-graduated microammeter connected in series with the field-effect transistor source and drain terminals, the field-effect transistor gate terminal being connected to said second contact of said first-mentioned momentarily-conductive switch.

References Cited

UNITED STATES PATENTS

| | | | |
|---|---|---|---|
| 2,905,898 | 9/1959 | Bernstein | 324—103 |
| 3,367,186 | 2/1968 | Ensign | 73—362 |
| 3,458,812 | 7/1969 | Krussmann | 324—103 |

FOREIGN PATENTS

| | | | |
|---|---|---|---|
| 952,568 | 12/1956 | Germany | 73—362 |
| 807,232 | 1/1959 | Great Britain | 73—362 |

LOUIS R. PRINCE, Primary Examiner

D. E. CORR, Assistant Examiner